United States Patent
Stedman

[15] 3,669,172
[45] June 13, 1972

[54] PROTECTIVE CHAIN ASSEMBLY FOR TIRES

[72] Inventor: Robert N. Stedman, Chillicothe, Ill.
[73] Assignee: Caterpillar Tractor Co., Peoria, Ill.
[22] Filed: July 24, 1970
[21] Appl. No.: 58,063

[52] U.S. Cl. ............................................. 152/171, 152/226
[51] Int. Cl. ........................................................... B60c 27/20
[58] Field of Search ............................... 152/171, 173, 226

[56] References Cited

UNITED STATES PATENTS

| | | | |
|---|---|---|---|
| 1,137,498 | 4/1915 | Leach | 152/171 |
| 1,200,355 | 10/1916 | Howard | 152/171 |
| 1,074,085 | 9/1913 | Hammond | 152/171 |

Primary Examiner—James B. Marbert
Attorney—Fryer, Tjensvold, Feix, Phillips & Lampio

[57] ABSTRACT

A pneumatic tire or the like has a protective chain assembly wrapped therearound. The chain assembly comprises a plurality of rings coupled together by notched and co-planar cylindrical coupling means which also serve as tread sections on the periphery of the tire. Each coupling member attaches two of the rings together to form a tire chain assembly exhibiting multi-directional flexibility. In addition, the integrated chain assembly is reversible and the dimensions thereof may be selectively varied to provide various earthworking functions, such as compacting. In the preferred embodiment, one group of such coupling members forms master coupling members or joints for assembly and disassembly purposes.

24 Claims, 18 Drawing Figures

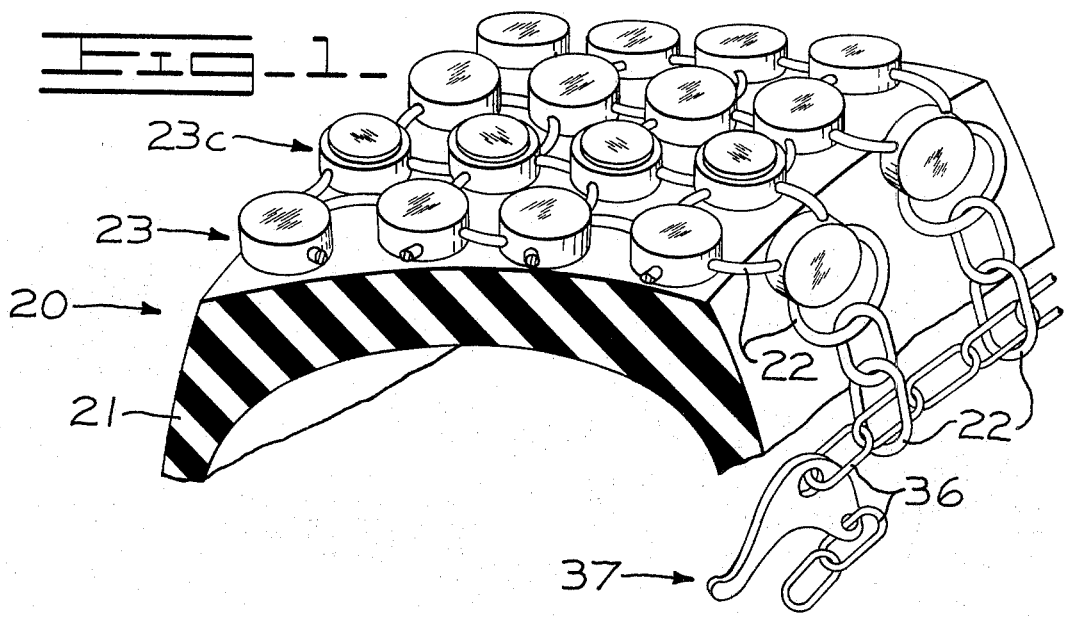
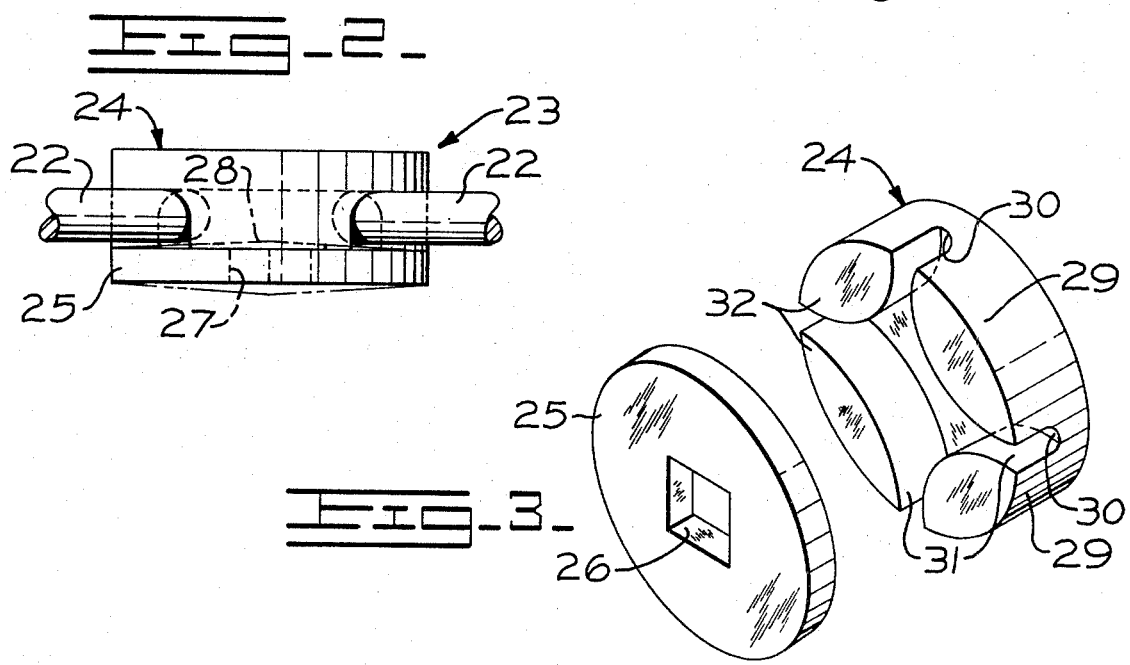
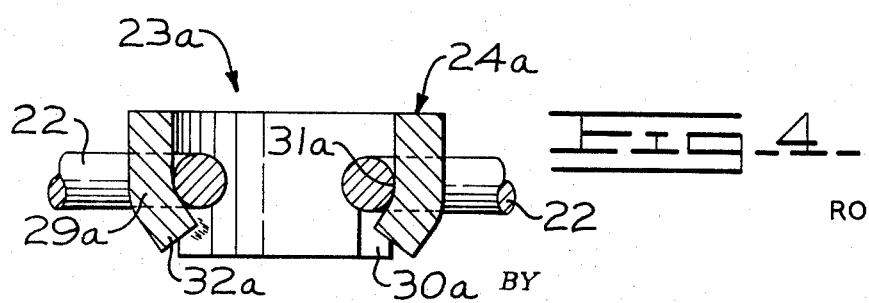
INVENTOR
ROBERT N. STEDMAN

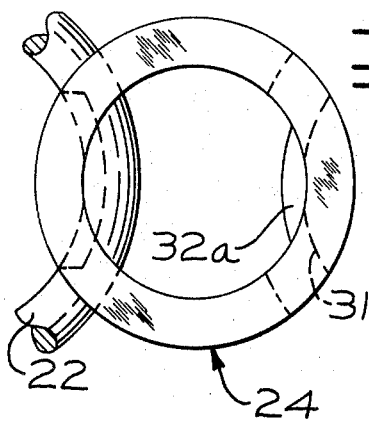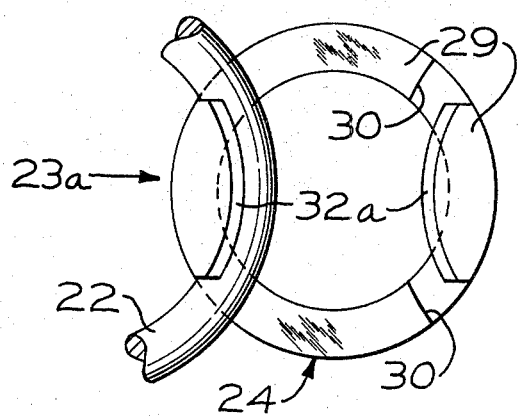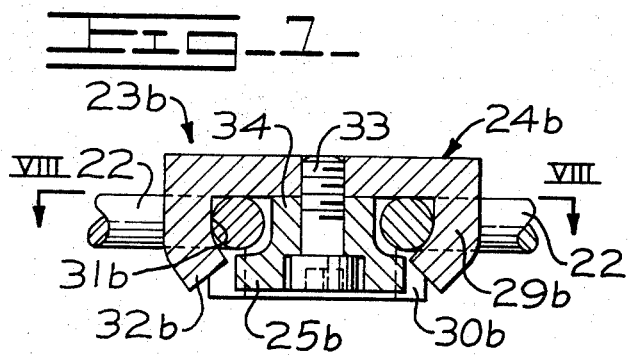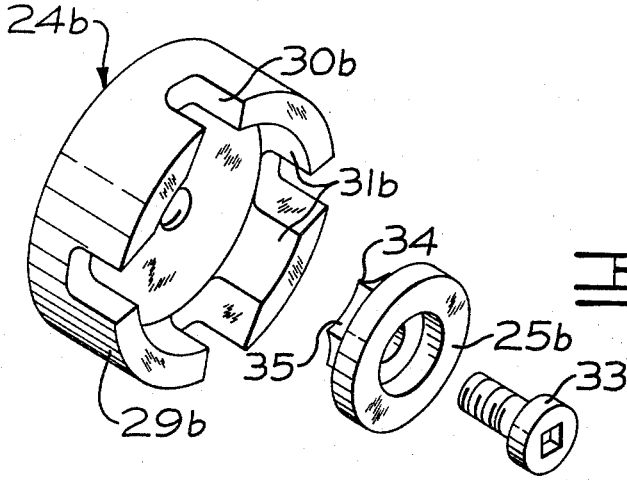

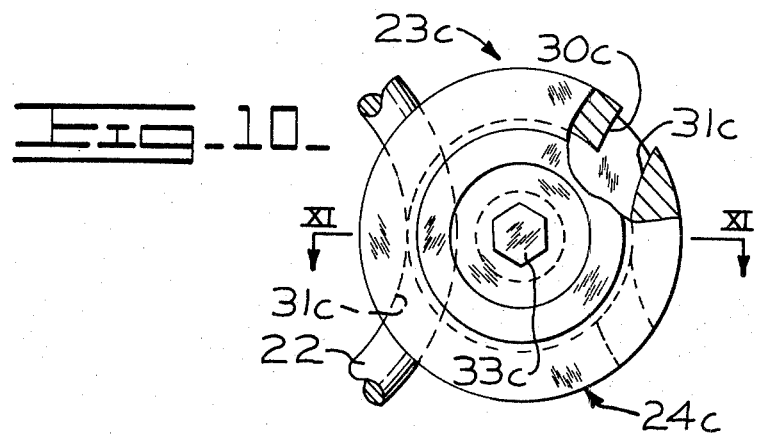
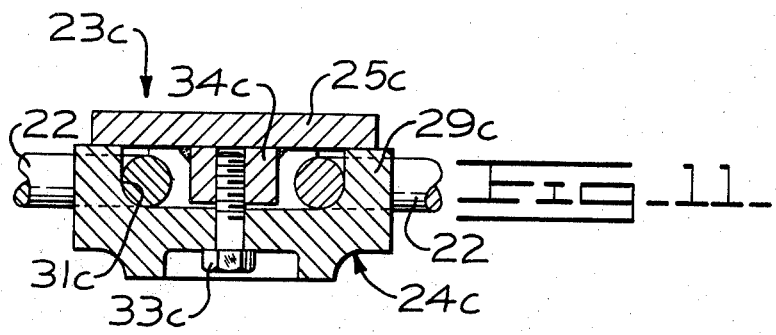
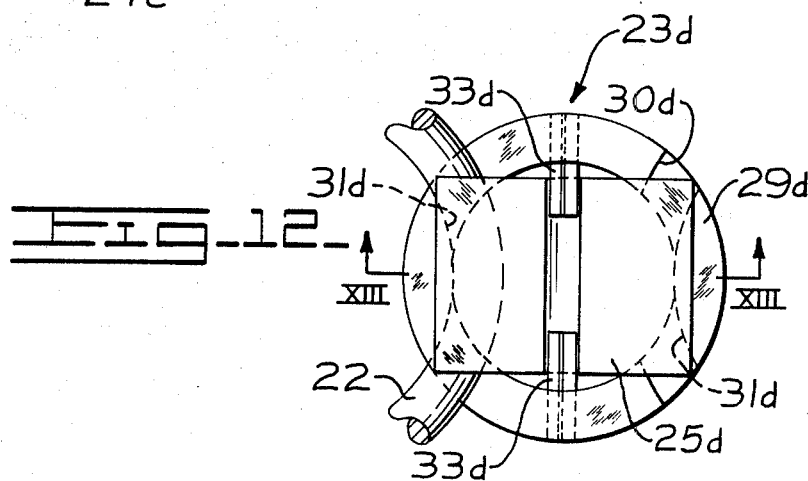
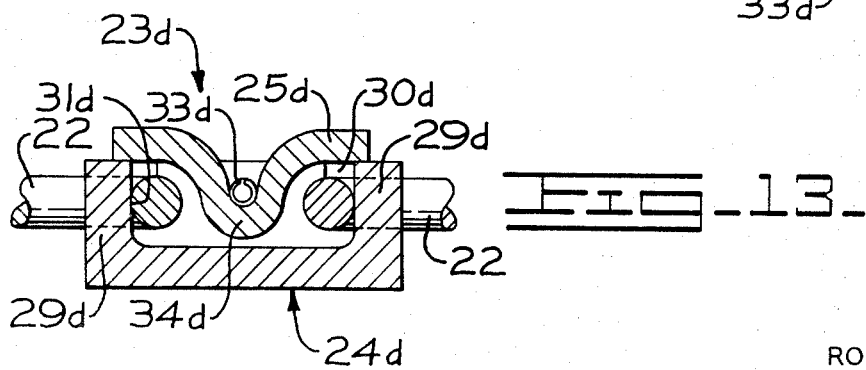

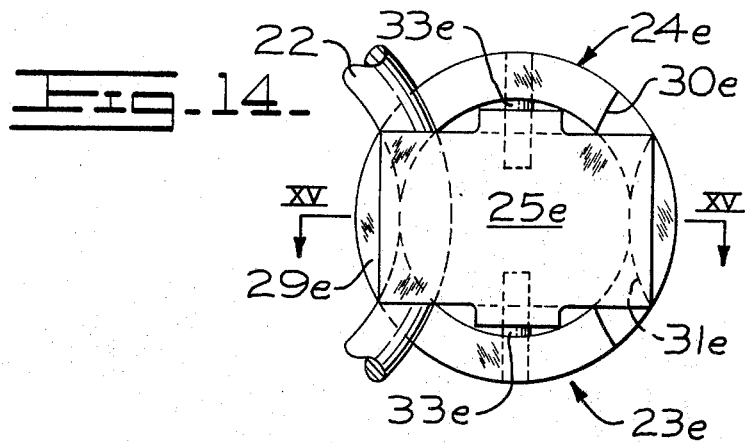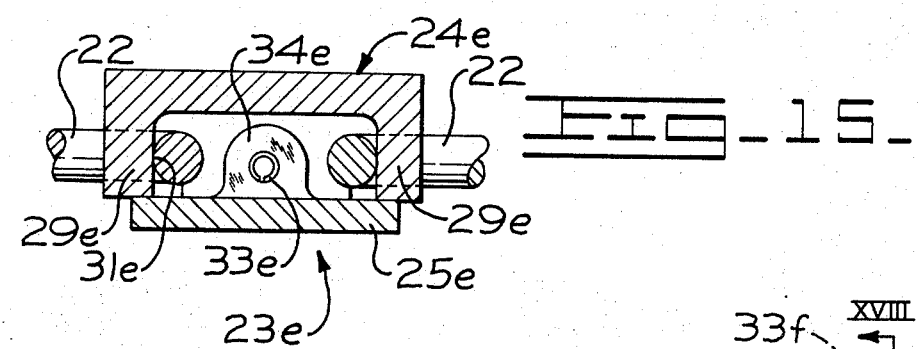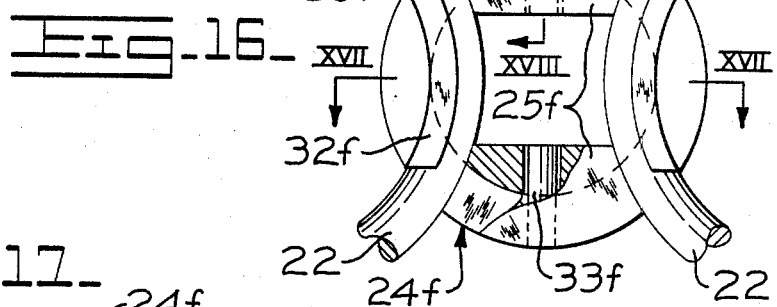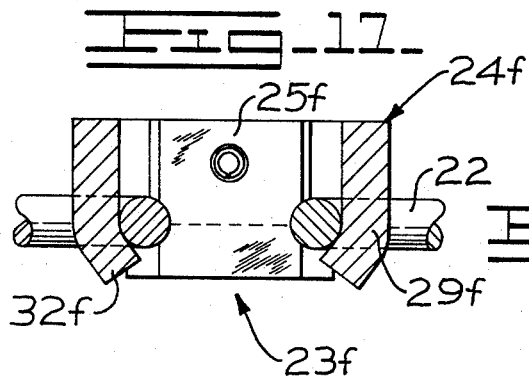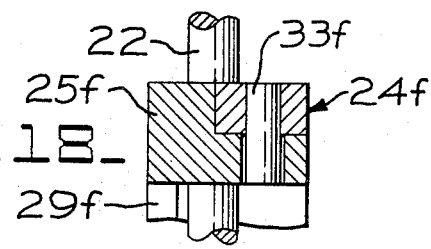

PROTECTIVE CHAIN ASSEMBLY FOR TIRES

BACKGROUND OF THE INVENTION

Attempts have been made to protect the rubber tires of conventional earthmoving vehicles against damage by armouring the tire with an encircling chain-type arrangement. Such tires are particularly prone to wear and damage when operated over sharp gravel or crushed or blasted rock of the type encountered in rock quarries and mines. Many such prior art armouring devices are expensive, bulky, prone to a high rate of wear and structural failure and incapable of expeditious assembly and repair. For example, conventional chains comprise a first set of links disposed in a common plane and a second set of connecting links disposed perpendicular relative to the first set.

SUMMARY OF OBJECTS OF THIS INVENTION

An object of this invention is to overcome the above, briefly described problems by providing an economical and non-complex protective chain assembly for tires which exhibits a high degree of structural integrity and ability to be readily assembled and repaired.

The chain assembly comprises a plurality of closed rings connected together by suitably spaced and substantially co-planar coupling members. Each coupling member is connected to two of the rings to form an integrated chain assembly exhibiting multi-directional flexibility. In the preferred embodiment, one group of coupling members are formed to comprise master coupling members or joints for assembly and disassembly purposes.

BRIEF DESCRIPTION OF THE DRAWINGS

Other objects of this invention will become apparent from the following description and accompanying drawings wherein:

FIG. 1 is a fragmentary, isometric view of a protective chain assembly embodiment of this invention mounted on a pneumatic tire;

FIG. 2 is a side elevational view of a coupling member employed in the FIG. 1 protective chain;

FIG. 3 is an exploded, isometric view of the FIG. 2 coupling member prior to its assembly;

FIG. 4 is a cross-sectional view of a second coupling member embodiment;

FIGS. 5 and 6 are top and bottom plan views, respectively, of the FIG. 4 coupling member;

FIG. 7 is a cross-sectional view of a first master coupling member embodiment;

FIG. 8 is a sectional view taken in the direction of arrows VIII—VIII in FIG. 7;

FIG. 9 is an exploded, isometric view of the FIG. 7 master coupling member prior to its assembly;

FIG. 10 is a bottom plan view of a second master coupling member embodiment;

FIG. 11 is a cross-sectional view taken in the direction of arrows XI—XI in FIG. 10;

FIG. 12 is a bottom plan view of a third master coupling member embodiment;

FIG. 13 is a cross-sectional view taken in the direction of arrows XIII—XIII in FIG. 12;

FIG. 14 is a bottom plan view of a fourth master coupling member embodiment;

FIG. 15 is a cross-sectional view taken in the direction of arrows XV—XV in FIG. 14;

FIG. 16 is a bottom plan view of a fifth master coupling member embodiment;

FIG. 17 is a cross-sectional view taken in the direction of arrows XVII—XVII in FIG. 16; and FIG. 18 is a cross-sectional view of one of the blocks employed in the FIGS. 16 and 17 embodiment.

DESCRIPTION OF THE PREFERRED EMBODIMENTS

FIG. 1 illustrates a protective chain assembly 20 suitably wrapped around an annular, pneumatic rubber tire 21. The chain assembly comprises approximately equally spaced, closed metallic rings 22 connected together by substantially co-planar cylindrical coupling members 23. As will be hereinafter described, a standard chain may be trained through additional rings, positioned adjacent to the side walls of the tire, to retain the integrated protective chain assembly thereon.

Each row of four coupling members is positioned in substantial parallel relationship with respect to the rotational axis of the tire (not shown) to form ground engaging tread sections. Referring to FIGS. 2 and 3, each coupling member comprises a cylindrical member 24 having an annular washer or plug 25 welded or otherwise suitably secured thereto.

When inertia welding techniques are employed for securing washer 25 to member 24, such washer may be pre-formed to have an outside diameter slightly larger than the member's diameter. In addition, the engaging surfaces of the washer and member may be conically shaped, as shown at 28 in FIG. 2, for centering purposes. A hole 26 may be formed in the washer to afford a drive connection for the welder. Member 24 has four identical, circumferentially disposed lugs 29 formed thereon to be substantially parallel with each adjacent pair of lugs being separated by notch means 30.

Each lug has arcuate inner surface portions 31 formed thereon at a diameter approximately equalling the inner diameter of ring 22 to provide a substantial, but "loose" bearing area therefor. The arcuate bearing surfaces are suitably spaced to permit rings to rotate and to pivot transversely relative to its connected coupling member. The washer is secured to flat end portions 32 of the lugs to provide means for attaching two diametrically opposed rings to member 24. After extended use, the washer could be removed and rings 22 mounted on the next adjacent and diametrically opposed bearing surfaces 31 to prolong the life of the coupling member.

FIGS. 4-6 illustrate a second coupling member embodiment 23a. The hereinafter described embodiments are similar in certain respects to the FIGS. 2 and 3 embodiment. Therefore, like numerals will depict structures exhibiting similar functions, but with numerals appearing in FIGS. 4-18 being accompanied by an a, b, c, d, e, or f.

Coupling member 23a comprises a cylindrical member 24a having two pairs of diametrically opposed and upstanding lugs 29a formed thereon. The adjacent lugs are separated by notch means 30a which further aid in defining ring engaging curved inner surface portions 31a on two lugs. The end portions or extremities of a first pair of diametrically opposed lugs are suitably crimped or bent towards each other at 32a to at least partially overlie rings 22. The first bent pair and second unbent pair of lugs thus provide means for attaching the rings to member 24a by capturing the rings therebetween.

FIGS. 7-9 illustrate a coupling member embodiment 23b comprising a cylindrical member 24b having four equally spaced lugs 29b formed thereon to be separated by notch means 30b. Two opposed lugs each have curved inner surface portions 31b formed thereon to substantially conform to the inner diameter of a respective ring 22. Means for attaching the rings to the coupling members comprise crimped ends 32b (FIG. 7) and a stepped-down washer 25b.

The centrally disposed washer may be suitably attached to member 24b by means of a set screw 33, a rivet or other suitable fastening means. A reduced portion 34 is formed on the washer to suitably space the washer on member 24b. The reduced portion may have arcuate outer bearing surfaces 35 formed thereon to substantially conform to the outer diameter of each ring 22.

Referring to FIGS. 1, 10 and 11, one row of the coupling members preferably comprises master coupling means or members 23c for selectively attaching the protective chain assembly to tire 21. Such first embodiment comprises a cylindrical member 24c having a lug 34c of a cover plate 25c attached thereto by means of a cap screw 33c. Arcuate notch means 30c define four upstanding lugs 29c with two diametrically opposed lugs having ring engaging arcuate surface portions 31c formed thereon.

FIGS. 12 and 13 illustrate a second master coupling member embodiment 23d comprising a cylindrical member 24d having a cover plate 25d for partially covering and attaching rings 22 thereto. The rectangular plate has a centrally disposed and depressed area 34d for receiving releasable pin means such as roll pins 33d therein. The roll pins may be driven inwardly towards each other for disassembly purposes (FIG. 13). Notch means 30d separate the lugs and aid in defining curved ring engaging surface portions 31d on two diametrically opposed lug members 29d.

FIGS. 14 and 15 illustrate a third master coupling member embodiment 23e comprising a cylindrical member 24e having a generally rectangularly shaped cover plate 25e attached thereto by means of releasable pin means or roll pins 33e. The pins may be press fitted into member 24e and inserted through apertures suitably formed in ear-like projections 34e formed at the ends of plate 25e. Notch means 30e are formed on the member to define ring engaging curved surface portions 31e on two diametrically opposed lugs 29e.

FIGS. 16, 17, and 18 illustrate a fourth master coupling member embodiment 23f comprising a cylindrical member 24f having two upstanding lugs 29f formed thereon. The ends of the lugs are crimped at 32f to at least partially overlie rings 22. Such crimped lug portions cooperate with two diametrically disposed blocks 25f to capture the rings therebetween for attaching and retaining the rings in place. The blocks may be releasably attached to member 24f by roll pins or pin means 33f and has ring abutting arcuate surfaces 35f formed thereon.

Referring again to FIG. 1 chain assembly 20 is installed in a conventional manner by being placed and secured circumferentially about tire 21. At this time tightening of a pair of annular restraining chains 36 trained through end rings 22 spaced about each side of the tire causes relative shifting or tensioning-rhombus like interaction between the rings and couplings. Such an interaction not only holds the chain radially but results in a reduction of the overall installed diameter to assure an optimum fit for the chain in all operational conditions.

The number of rings and coupling members employed may be varied to adapt the chain assembly to varied tire sizes and tread widths. As shown in FIG. 1, one of the novel features of this invention is the substantial co-planar relationship of the rings and coupling members. Also, the normally co-planar rings are positioned radially inwardly relative to the flat ground-engaging outer surface portions of the coupling members to substantially avoid ground contact.

The ground-engaging surface portions of the coupling members are preferably circular and flat and substantially disposed in a common plane about the tire. Collectively, such outer surface portions provide a substantial, highly functional and durable annular tread section about the tire in contrast to conventional protective chain assemblies wherein connected links are disposed perpendicularly relative to each other.

The extrusion of the various coupling members into substantially finished form by automated processing greatly reduces the overall cost of the chain assembly. Although annular members 24 and 24a–24f are preferably cylindrical, they may comprise other polygonal shapes, such as hexagonal, to adapt them for various operations such as compacting. In addition, the partially opened ends of members 24a–24f could be fully closed by suitable capping or the like to further increase the reversibility capabilities of the integrated chain assembly.

What is claimed is:

1. A protective chain assembly adapted to be mounted on a tire comprising
   a plurality of closed rings,
   a plurality of spaced coupling members normally positioned in substantial co-planar relationship with respect to said rings and
   attaching means solely loosely connecting two of said rings to each of said coupling members and further loosely connecting each ring to at least three of said coupling members to permit each ring to exhibit multi-directional flexibility relative to its attached coupling members.

2. The invention of claim 1 wherein said rings are positioned radially inwardly relative to radially outer, ground engaging surface portions of said coupling members and wherein each ring is solely connected to four of said coupling members.

3. The invention of claim 2 wherein each of said coupling members is generally cylindrical with the radially outer, ground-engaging surface portions thereof collectively forming a substantial annular tread section.

4. The invention of claim 3 wherein the radially outer, ground-engaging surface portions of said coupling members are circular and substantially flat.

5. The invention of claim 1 wherein each of said coupling members comprises means forming an arcuate bearing surface having a respective one of said rings mounted thereon, said bearing surface substantially conforming to an inner diameter of said ring.

6. The invention of claim 1 wherein said chain assembly is mounted completely around an annular tire, the collective radially outer ground-engaging surface portions of said coupling members forming a substantial tread section on the periphery of said tire.

7. The invention of claim 6 wherein the radially, outer surface portions of each of said coupling members are substantially flat, all of said outer surface portions substantially normally lying in the same plane.

8. The invention of claim 6 further comprising annular retaining means operatively connected to a plurality of circumferentially disposed rings positioned adjacent to each side wall of said tire for preventing removal of said protective chain assembly therefrom.

9. The invention of claim 8 further comprising tightening means operatively connected to said retaining means for selectively tightening said protective chain assembly on said tire.

10. The invention of claim 7 wherein said coupling members comprise a plurality of master coupling means for selectively removing said protective chain assembly from said tire.

11. The invention of claim 1 wherein said coupling members comprise a cylindrical member having notch means formed therein to form at least one pair of diametrically opposed lugs, one of said rings being mounted on each of said lugs.

12. The invention of claim 11 further comprising means forming an arcuate bearing on radially inner surface portions of each of said lugs, one of said rings mounted on each of said bearings.

13. The invention of claim 12 wherein each of said bearings substantially conforms to an inner diameter of each of said rings.

14. The invention of claim 12 wherein two pairs of said diametrically opposed lugs are formed on said cylindrical member, said bearing formed on each of said lugs.

15. The invention of claim 11 wherein said attaching means comprises an annular plug secured to said member and having an outside diameter substantially equalling the outside diameter of said cylindrical member.

16. The invention of claim 15 wherein said plug has means forming a centrally disposed opening therethrough.

17. The invention of claim 11 wherein said attaching means comprises bent end portions of said lugs with said end portions being bent towards each other to at least partially overlie said rings.

18. The invention of claim 17 wherein said attaching means further comprises a second unbent pair of diametrically opposed lugs cooperating with said first mentioned, bent pair of lugs to capture said rings therebetween.

19. The invention of claim 17 wherein said attaching means further comprises a centrally disposed stepped-down washer attached to said cylindrical member and forming a reduced portion thereon, each of said rings positioned between one of said lugs and said reduced portion.

20. The invention of claim 19 wherein said reduced portion has means forming arcuate outer bearing surfaces thereon substantially conforming to the outer diameter of said rings.

21. The invention of claim 17 wherein said attaching means further comprises pairs of blocks mating with said cylindrical member to cooperate with said lugs to capture said rings therebetween and removable pin means for attaching said blocks to said cylindrical member.

22. The invention of claim 11 wherein said attaching means comprises a cover plate attached to said cylindrical member by releasable pin means, said cover plate positioned to fully cover portions of said rings.

23. The invention of claim 22 wherein said cover plate has a centrally disposed depressed area, said releasable pin means positioned in said depressed area.

24. The invention of claim 22 wherein said cover plate has ear-like projections formed at ends thereof, said releasable pin means inserted into said projections.

* * * * *